United States Patent
Tanimoto (10) Patent No.: US 7,626,900 B2
(45) Date of Patent: Dec. 1, 2009

(54) OPTICAL PICKUP AND DISK DRIVE APPARATUS

(75) Inventor: Takeshi Tanimoto, Saitama (JP)

(73) Assignee: Sony Corporation, Tokyo (JP)

( * ) Notice: Subject to any disclaimer, the term of this patent is extended or adjusted under 35 U.S.C. 154(b) by 711 days.

(21) Appl. No.: 10/943,858

(22) Filed: Sep. 20, 2004

(65) Prior Publication Data

US 2005/0088950 A1    Apr. 28, 2005

(30) Foreign Application Priority Data

Sep. 24, 2003   (JP) .............. P2003-331506

(51) Int. Cl.
*G11B 7/00*  (2006.01)
(52) U.S. Cl. ............. 369/44.37; 369/44.23; 369/112.03
(58) Field of Classification Search ........................ None
See application file for complete search history.

(56) References Cited

U.S. PATENT DOCUMENTS

| | | | | |
|---|---|---|---|---|
| 5,168,490 A | * | 12/1992 | Braat ................. | 369/109.02 |
| 5,648,946 A | * | 7/1997 | Yamazaki ............... | 369/44.23 |
| 7,242,648 B2 | * | 7/2007 | Yamada et al. ........... | 369/44.37 |
| 2001/0036137 A1 | * | 11/2001 | Katayama .............. | 369/53.19 |
| 2002/0027844 A1 | * | 3/2002 | Furuhata et al. ......... | 369/44.37 |
| 2006/0104186 A1 | * | 5/2006 | Matsuda ................ | 369/112.03 |

FOREIGN PATENT DOCUMENTS

| | | |
|---|---|---|
| JP | 03-054733 | 3/1991 |
| JP | 09-231589 | 9/1997 |
| JP | 2000-187881 | 7/2000 |
| JP | 2001-176115 | 6/2001 |
| JP | 2003-045051 | 2/2003 |

OTHER PUBLICATIONS

JP 10-269587, Takahara Ikuo, Optical pickup device, Sep. 1998 (English Translation).*

* cited by examiner

*Primary Examiner*—Wayne R Young
*Assistant Examiner*—Van N Chow
(74) *Attorney, Agent, or Firm*—Oblon, Spivak, McClelland, Maier & Neustadt, L.L.P.

(57) ABSTRACT

In an optical pickup for irradiating a laser beam emitted from a photoemission element on a disk-like recording medium through an objective lens, there is provided a diffraction element including a first region for splitting the laser beam emitted from the photoemission element into a main beam and a pair of first sub-beams and a second region for splitting the laser into a main beam and a pair of second sub-beams, wherein a following relation hold or approximately hold: $(2n-1) \times P/2$, where D is a distance between a spot center of the first sub-beam and a spot center of the second sub-beam, the spots being formed on a recording surface of the disk-like recording medium spaced in a substantially radial direction of the disk-like recording medium, n is a natural number, and P is a track pitch of the disk-like recording medium.

16 Claims, 7 Drawing Sheets

F I G. 2
PRIOR ART

— MAIN BEAM
····· SUB-BEAM
— DPP

F I G. 3

——— MAIN BEAM
······· SUB-BEAM AFTER DECREASE
—··— SUB-BEAM BEFORE DECREASE
——— DPP AFTER DECREASE
—·— DPP BEFORE DECREASE

- MAIN BEAM
- SUB-BEAM
- DDP

OPTICAL PICKUP AND DISK DRIVE APPARATUS

CROSS REFERENCES TO RELATED APPLICATIONS

The present invention claims priority to its priority document No. 2003-331506 filed in the Japanese Patent Office on Sep. 24, 2003, the entire contents of which being incorporated by reference herein.

BACKGROUND OF THE INVENTION

1. Field of the Invention

The present invention relates to a technical field regarding an optical pickup and a disk drive apparatus and particularly relates to a technical field for improving quality of a tracking error signal and suppressing effects of eccentricity of a disk-like recording medium or the like.

2. Description of the Related Art

Disk drive apparatuses for recording or reproducing an information signal on and from a disk-like recording medium are known. Such a disk drive apparatus includes an optical pickup movable in a radial direction of the disk-like recording medium mounted on a disk table for recording or reproducing the information signal by irradiating a laser beam through an objective lens on the disk-like recording medium.

In the optical pickup, the focusing adjustment is carried out by shifting an objective lens in far and near directions (focusing direction) with respect to a recording surface of the disk-like recording medium in response to the detection of a focusing error signal. Further, a tracking error signal is detected to perform tracking adjustment by shifting the objective lens in a substantially radial direction of the disk-like recording medium (tracking direction).

A push-pull method is known as a method of detecting the tracking error signal. However, there is a problem in this method that a large dc variation (DC offset) signal tends to occur when the objective lens is displaced in the tracking direction.

Accordingly, as a method of detecting the tracking error signal, a differential push-pull method capable of reducing the DC offset signal is widely used (for example, see Japanese Patent Application Publication 61-94246).

Figure 1:
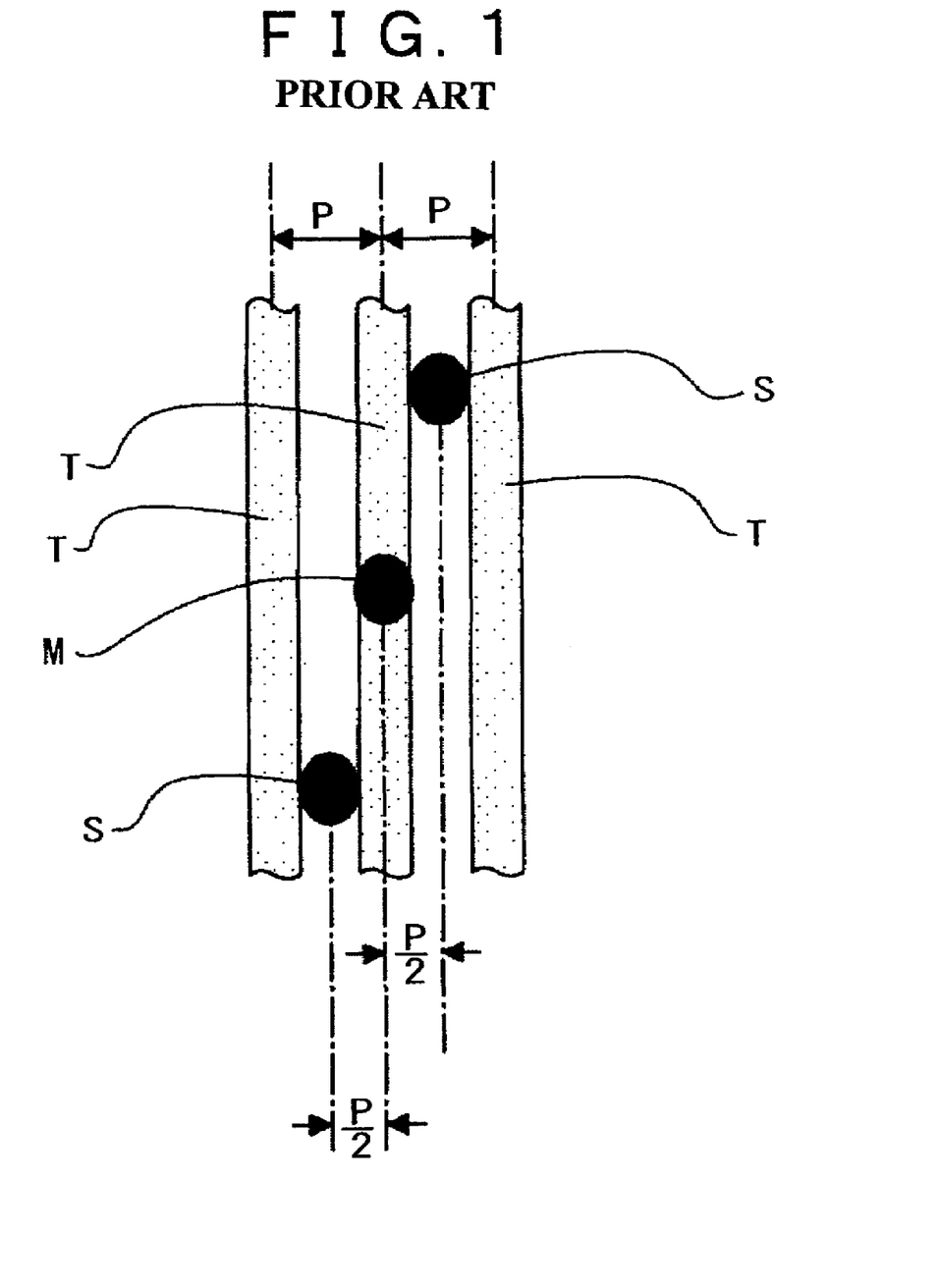
FIG. 1 is a conceptual drawing illustrating a condition of a spot of a laser beam in the case of a differential push-pull method is used in an optical pickup of related art.

In the differential push-pull method, a laser beam is split into a main beam and a pair of sub-beams by a diffraction element, and as shown in FIG. 1, each of the sub-spots S, S, formed on a recording surface of a disk-like recording medium, is located between adjacent tracks T, T in such a way that the distances in the radial direction of the disk between the sub-spots S, S and the spot caused by the main beam (main spot) M are set to a half of a track pitch P, respectively.

Figure 2:
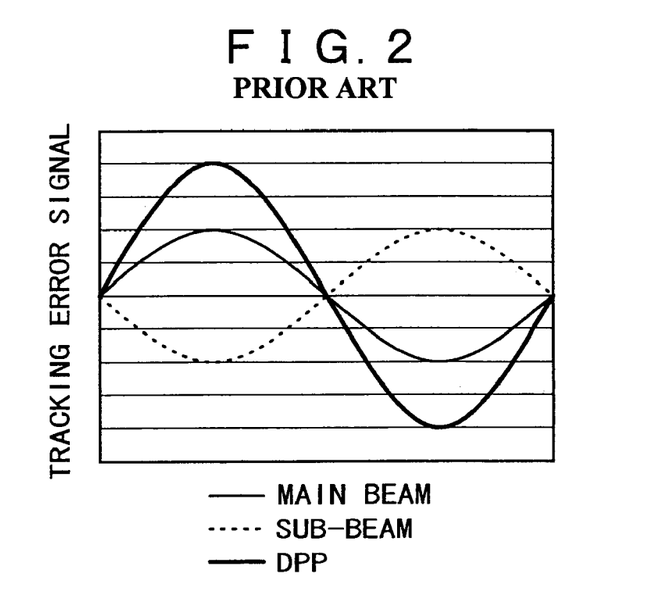
FIG. 2 is a graphical drawing illustrating a tracking error signal in the case of the differential push-pull method is used in an optical pickup of related art.

As mentioned above, in the differential push-pull method, by making the distances in the radial direction of the disk between each of the sub-spots S, S and a spot caused by the main beam (main spot) M half of a track pitch P, the DC offset signal is cancelled by inverting the phase of the tracking error signal detected from the main beam and the phase of the tracking error signal detected from the sub-beams (see FIG. 2).

SUMMARY OF THE INVENTION

Figure 3:
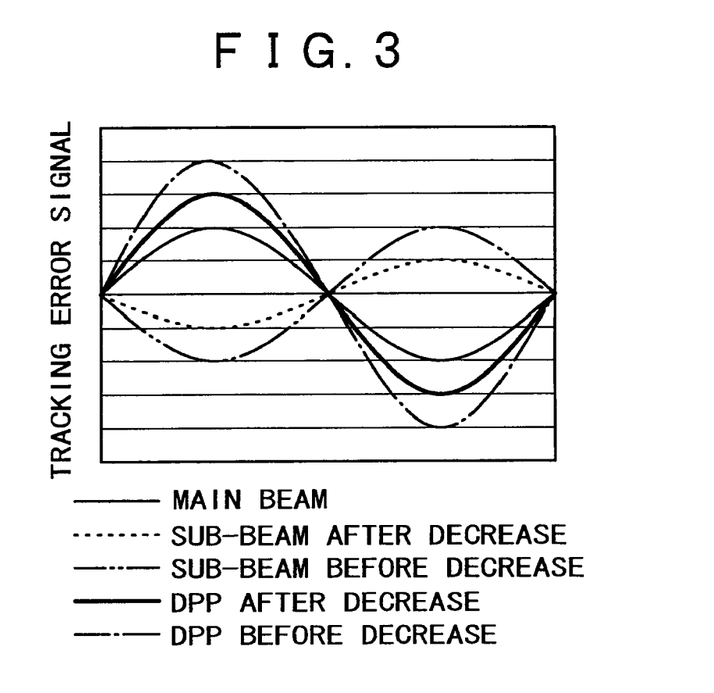
FIG. 3 is a graphical drawing illustrating a shortcoming associated with related art.

However, in the case that the above-described differential push-pull method is adopted, if there is the eccentricity of the disk-like recording medium or an angular deviation (deviation in the rotation direction) of a diffraction element due to environmental change such as temperature, two sub-spots S, S may be displaced from adjacent tracks T, T. This positional deviation causes phases of the tracking error signals detected from two sub-beams to deviate from each other, so that, as shown in FIG. 3, the amplitudes of the tracking error signals detected from the sub-beams decrease as shown in FIG. 3, which results in an unsatisfied condition in which an amplitude of a differential push-pull (DPP) signal decreases.

Particular, if the eccentricity exists in the disk-like recording medium, the amplitude of the DPP signal varies every rotation of the disk-like recording medium, which tends to decrease a characteristic of tracking servo.

On the other hand, there are disk drive apparatuses capable of recording or reproducing the information signal with respect to a plurality of different types of disk-like media, for example, both CD s (Compact Disc) and DVDs (Digital Versatile Disc).

In such a disk drive apparatus, it is difficult to locate the sub-spots between adjacent tracks in each disk-like recording medium because track pitches are different in the respective disk-like recording media as well as a diffraction angle of the sub-beams varies in accordance with the wavelength if a common diffraction element is used for each wavelength.

Accordingly, in such a condition, for example, if setting is made so as to position the sub-spots between adjacent tracks only for one type of disk-like recording medium, particularly, a variation amount in amplitude of the DPP signal becomes large as well as the DC offset signal becomes large when the information signal is recorded or reproduced for another disk-like recording medium. Here, it is also considered that the sub-spots are located at intermediate positions with respect to the optimum position for each recording medium. However, this causes variation in the amplitude of the DPP signal and development of a DC offset signal. This results in deterioration of the tracking servo characteristic.

In the above-described case, the use of diffraction elements specially prepared for respective disk-like recording media provides proper operation. However, this case requires a plurality of diffraction elements, which will cause a new problem of increase in cost due to increase in the number of parts. Further, in the case of disk-like recording media using the same wavelength, for example, the DVD, track pitches are different from each other among the DVD-ROM (Read Only Memory), DVD±R (Recordable), the DVD-RW (Rewritable), and the DVD-RAM (Random Access Memory). Accordingly, the use of special diffraction elements for all types of DVDs causes a further increase in the number of parts and cost.

Accordingly, an optical pickup and a disk drive apparatus according to the present invention are provided in view of the above-described problems. Further, it is desirable to improve quality of the tracking error signal and/or suppress effects of the eccentricity of a disk-like recording medium.

According to one embodiment of the present invention, there is provided an optical pickup for irradiating a laser beam emitted from a photoemission element on a disk-like recording medium through an objective lens includes: a diffraction element including a first region for splitting the laser beam emitted from the photoemission element into a main beam and a pair of first sub-beams and a second region for splitting the laser into a main beam and a pair of second sub-beams, wherein a following relation hold or approximately hold: $(2n-1) \times P/2$ where D is a distance between a spot center of the first sub-beam and a spot center of the second sub-beam, the spots being formed on a recording surface of the disk-like recording medium spaced in a substantially radial direction of the disk-like recording medium, n is a natural number, and P is a track pitch of the disk-like recording medium.

Accordingly, in the detection of the tracking error signal, the quality of the tracking error signal may be improved, and the effects of the eccentricity in a disk-like recording medium or the like may be suppressed.

Further, the rotation adjustment of the diffraction element may be eliminated since the effect of rotational deviation of the diffraction element may be suppressed, whereby allowing production of the optical pickup at a lower cost with a higher reliability.

According to another embodiment of the present invention, a plurality of the first region and a plurality of the second regions are formed in the diffraction element in such a way that amounts of light in the first sub-beam and the second sub-beam are the same and substantially the same, thereby ensuring the cancellation of the tracking error signals detected by respective sub-beams and improving the reliability of the tracking control operation.

According to another embodiment of the present invention, the first region and the second region are disposed in a tangential direction of the disk-like recording medium. Accordingly, during the tracking control operation, no change occurs in relative positions between the laser light beam incident on the diffraction element and each region of the diffraction element, whereby producing no adverse effect in generating the sub-beam by the diffraction element. Alternatively, a plurality of the first regions and a plurality of the second regions may be arranged such that the first region and the second region alternately disposed in a tangential direction of the disk-like recording medium.

Further, during the tracking control operation, a relation between the main beam and the original laser beam before diffraction is maintained, whereby producing no adverse effect in modulation.

According to another embodiment of the present invention, there is provided an optical pickup. The optical pickup is capable of recording or reproducing an information signal for a plurality of different types of disk-like recording media in which different wavelengths are used, for irradiating a laser beam, which has a wavelength corresponding to one of the plurality of different types of disk-like recording media and is emitted from a photoemission element, onto a disk-like recording medium through an objective lens. The optical pickup includes a diffraction elements including a first region for splitting the laser beams having different wavelengths into a main beam and a pair of first sub-beams, and a second region for splitting the laser beams into a main beam and a pair of second sub-beams, wherein, for a disk-like recording medium with any one of the plurality of different types, a following relation hold or approximately hold: $(2n-1) \times P/2$, where D is a distance between a spot center of the first sub-beam and a spot center of the second sub-beam, the spots being formed on a recording surface of the disk-like recording medium with being spaced in a substantially radial direction of the disk-like recording medium, n is a natural number, and P is a track pitch of the disk-like recording medium.

Accordingly, during the recording or reproduction of the information signal on the disk-like recording medium, the quality of the tracking error signal may be improved, and, in the detection of the tracking error signal, the effect of eccentricity of the disk-like recording medium may be suppressed.

Further, if the recording or reproduction for different types of disk-like recording media, the same diffraction element may be used. Accordingly, the quality of the tracking error signal may be improved without increasing the number of parts and cost. According to another embodiment of the present invention, a plurality of the first region and a plurality of the second regions are formed in the diffraction element in such a way that amounts of light in the first and the second sub-beam are the same or substantially the same, the first and second sub-beams being formed on a recording surface of the disk-like recording medium with being spaced in a substantially radial direction of the disk-like recording medium. Accordingly, it is ensured that the tracking error signals detected from sub-beams may be cancelled by each other, thereby improving reliability of the tracking control operation.

According to another embodiment of the present invention, the first region and the second region are disposed in a tangential direction of the disk-like recording medium. Accordingly, during the tracking control operation, no change occurs in relative positions between a laser light beam incident on the diffraction element and each region of the diffraction element, whereby producing no adverse effect in generating of the sub-beam by the diffraction element. Alternatively, a plurality of the first regions and a plurality of the second regions may be arranged such that the first region and the second region alternately disposed in a tangential direction of the disk-like recording medium.

Further, during the tracking control operation, a relation between the main beam and the original laser beam before diffraction is maintained, whereby producing no adverse effect in modulation.

According to another embodiment of the present invention, there is provided a disk drive apparatus including: a disk table on which a disk-like recording medium is mounted and rotated, and an optical pickup, in which an objective lens driving unit is supported on a moving base that moves in a radial direction of the disk-like recording medium mounted on the disk table, for irradiating a laser beam on the disk-like recording medium through an objective lens, wherein the optical pickup includes: a diffraction element including a first region for splitting the laser beam emitted from the photoemission element into a main beam and a pair of first sub-beams, and a second region for splitting the laser beam into a main beam and a pair of second sub-beams, wherein a following relation hold or approximately hold: $(2n-1) \times P/2$, where D is a distance between a spot center of the first sub-beam and a spot center of the second sub-beam, the spots being formed on a recording surface of the disk-like recording medium spaced in a substantially radial direction of the disk-like recording medium, n is a natural number, and P is a track pitch of the disk-like recording medium.

In the detection of the tracking error signal, the quality of the tracking error signal may be improved, and the effects of eccentricity of the disk-like recording medium or the rotational deviation of the diffraction element may be suppressed.

Further, the rotation adjustment of the diffraction element may be eliminated since the effects of the rotational deviation in the diffraction element may be reduced, whereby allowing the production of the optical pickup at a lower cost with a higher reliability.

According to another embodiment of the present invention, a plurality of the first regions and a plurality of the second regions are formed in the diffraction element in such a way that amounts of light in the first sub-beam and the second sub-beam formed on the recording surface of the disk-like recording medium with being spaced in a substantially radial direction of the disk-like recording medium is equal or substantially equal, thereby ensuring cancellation of the tracking error signals detected from respective sub-beams and improving the reliability of the tracking control operation.

According to another embodiment of the present invention, the first region and the second region are disposed in a tangential direction of the disk-like recording medium. Accordingly, during the tracking control operation, no change occurs in relative positions between the laser light beam incident on the diffraction element and each region of the diffraction element, thereby producing no adverse effect in generating the sub-beam by the diffraction element. Alternatively, a plurality of the first regions and a plurality of the second regions may be arranged such that the first region and the second region alternately disposed in a tangential direction of the disk-like recording medium.

Further, during the tracking control operation, a relation between the main beam and the original laser beam before diffraction is maintained, thereby producing no adverse effect in the modulation.

According to another embodiment of the present invention, there is provided a disk drive apparatus capable of recording or reproducing an information signal for a plurality of different types of disk-like recording media in which different wavelengths are used. The disk drive apparatus includes: a disk table to which a disk-like recording medium is mounted and rotated, and an optical pickup, in which an objective lens driving unit is supported on a moving base that moves in a radial direction of the disk-like recording medium mounted on the disk table, for irradiating a laser beam on the disk-like recording medium through an objective lens, the laser beam having a wavelength corresponding to one of the different types of the mounted disk-like recording medium. The optical pickup includes: a diffraction elements including a first region for splitting the laser beams having different wavelengths into a main beam and a pair of first sub-beams; and a second region for splitting the laser beams into a main beam and a pair of second sub-beams, wherein, for a disk-like recording medium with any one of the plurality of different types, a following relation hold or approximately hold: $(2n-1) \times P/2$, where D is a distance between a spot center of the first sub-beam and a spot center of the second sub-beam, the spots being formed on a recording surface of the disk-like recording medium with being spaced in a substantially radial direction of the disk-like recording medium, n is a natural number, and P is a track pitch of the disk-like recording medium.

Accordingly, during the recording or reproduction of the information signal to and from a disk-like recording medium, the quality of the tracking error signal may be improved. Further, in the detection of the tracking error signal from a certain disk-like recording medium, the effects of the rotational deviation of the diffraction element or the eccentricity of the disk-like recording medium may be suppressed.

Further, the same diffraction element may be shared even if the recording or reproduction is performed for different types of disk-like recording media. Accordingly, the quality of the tracking error signal may be improved without increasing the number of parts and cost.

According to another embodiment of the present invention, a plurality of the first region and a plurality of the second regions are formed in the diffraction element in such a way that amounts of the first and second sub-beam formed on a recording surface of the disk-like recording medium are the same or substantially the same, the first and second sub-beams being spaced in a substantially radial direction of the disk-like recording medium, thereby ensuring cancellation of the tracking error signals detected from respective sub-beams, and improving the reliability of the tracking control operation.

According to another embodiment of the present invention, the first region and the second region are disposed in a tangential direction of the disk-like recording medium. Accordingly, during the tracking control operation, no change occurs in relative positions between a laser light beam incident on the diffraction element and each region of the diffraction element, thereby producing no adverse effect in generating the sub-beam by the diffraction element. Alternatively, a plurality of the first regions and a plurality of the second regions may be arranged such that the first region and the second region alternately disposed in a tangential direction of the disk-like recording medium.

Further, during the tracking control operation, a relation between the main beam and the original laser beam before diffraction is maintained, thereby producing no adverse effect in the modulation.

BRIEF DESCRIPTION OF THE DRAWINGS

The above and other objects, features and advantages of the present invention will become more apparent from the following description of the presently exemplary embodiment of the invention taken in conjunction with the accompanying drawings, in which.

DETAILED DESCRIPTION OF THE EMBODIMENTS

Hereinbelow, an optical pickup and a disk drive apparatus according to one embodiment of the present invention will be described with reference to the attached drawings.

The disk drive apparatus 1 is provided with respective predetermined members and respective predetermined mechanisms arranged within an outer case 2 (see FIG. 4), in which a disk loading slot (not shown) is formed in the outer case 2.

Figure 4:
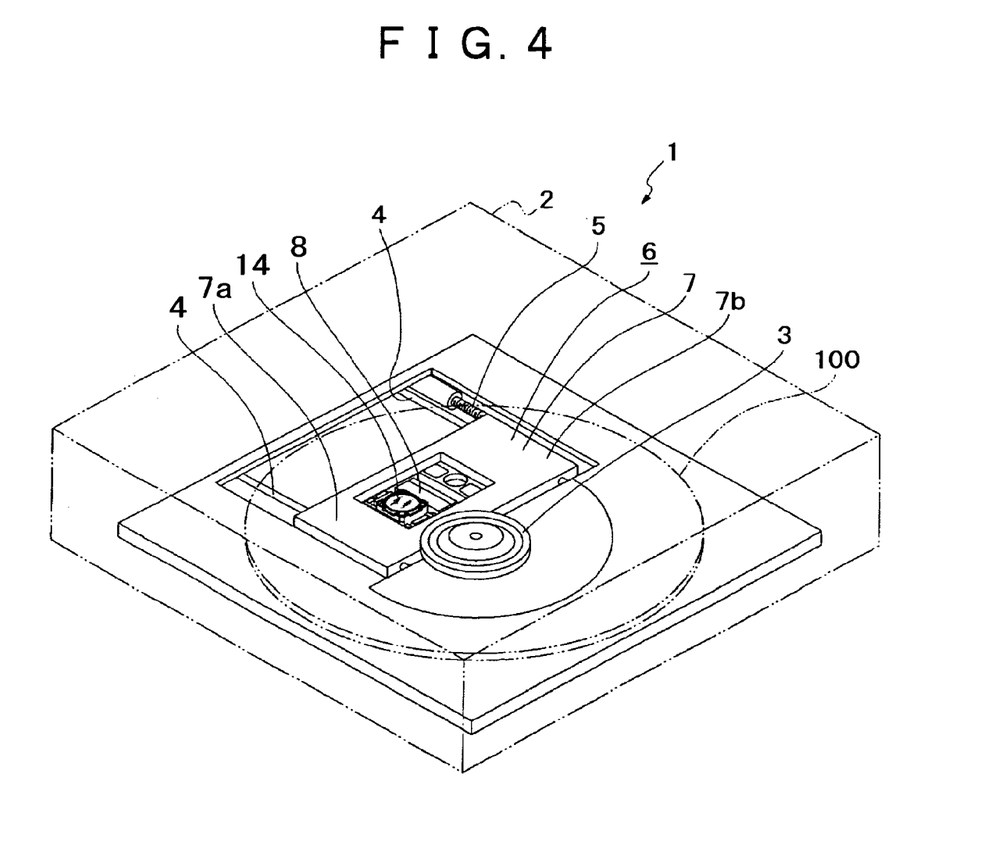
FIG. 4 is an outline perspective view of a disk drive apparatus according to an embodiment of the present invention.

Within the outer case, a chassis (not shown) is arranged, and a disk table 3 is fixed to a motor axis of a spindle motor mounted on the chassis.

Guide axes 4, 4 are arranged in parallel and fixed to the chassis which supports a lead screw 5 rotated by a feed motor (not shown).

The optical pickup 6 includes a moving base 7, predetermined optical parts arranged on the moving base 7 and an objective lens driving unit 8 arranged on the moving base 7. Further bearing sections 7a and 7b are provided at both edges of the moving base 7 so as to be slidingly supported by the guide axes 4, 4, respectively. A nut member (not shown) provided on the moving base 7 is coupled to the lead screw 5. Rotating the lead screw 5 by the feed motor shifts the nut member to a direction determined in accordance with the rotation direction of the lead screw, thereby moving the optical pickup 6 in a radial direction of the disk-like recording medium mounted on the disk table.

As the disk-like recording medium 100, for example, a CD 100a and a DVD 100b may be used.

In the disk drive apparatus 1 having the structure as mentioned above, upon rotation of the disk table 3 in response to rotation of the spindle motor, the disk-like recording medium 100, i.e., the CD 100a or the DVD 100b mounted on the disk table 3 is rotated as well as the optical pickup 6 is moved in a radial direction of the disk-like recording medium 100 so as to perform recording and reproducing operation for the disk-like recording medium 100.

Figure 5:
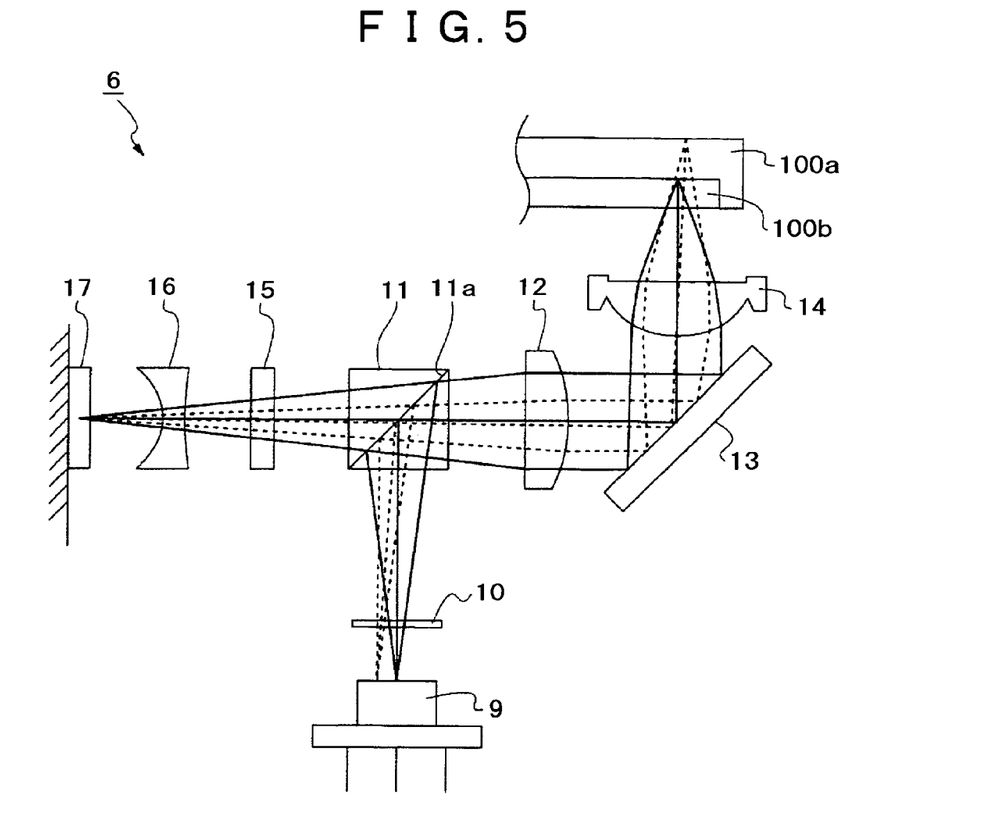
FIG. 5 is a conceptual drawing illustrating a structure of an optical pickup.

The optical pickup 6 includes, as shown in FIG. 5, a photoemission element 9, a diffraction element 10, a beam splitter 11, a collimator lens 12, a rising mirror 13, an objective lens 14, an optical axis combining element 15, an adjusting lens 16, and an photosensitive element 17. The photoemission element 9, the diffraction element 10, the beam splitter 11, the collimator lens 12, the rising mirror 13, the optical axis combining element 15, the adjusting lens 16, and an photosensitive element 17 are arranged on the moving base 7. The objective lens 14 is arranged on the objective lens driving unit 8.

The photoemission element 9 has two photoemission points for emitting laser beams having different wavelengths, wherein the first emission point emits a laser beam having a wavelength of, for example, 785 nm (first wavelength), and the second photoemission point emits a laser beam having a wavelength of, for example, 660 nm (second wavelength). When an information signal is recorded on or reproduced from one disk-like recording medium 100, namely, the CD100a, the laser beam having the wavelength of 785 nm is emitted from the first photoemission point. When the information signal is recorded on or reproduced from the other disk-like recording medium 100, namely, the DVD 100b, the laser beam having the wavelength of 660 nm is emitted from the second photoemission point.

The first and second photoemission points of the photoemission element 9 are arranged with a predetermined interval therebetween, wherein the laser beam having the second wavelength aligned in an optical axis of an optical system while the laser beam having the first wavelength deviates from the optical axis of the optical system.

Figure 6:
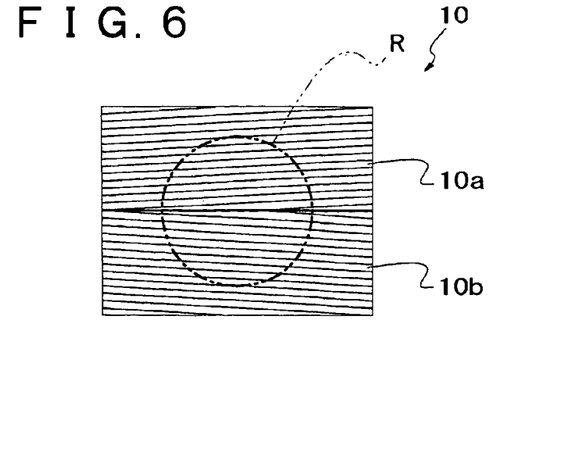
FIG. 6 is a conceptual drawing illustrating a diffraction element.

The diffraction element 10 includes, for example, a grating whose region is divided into the first region 10a and the second region 10b (see FIG. 6). The laser beam R is incident on the first region 10a and the second region 10b thereacross in which the laser beam incident on the first region 10a is split into a main bean (zero$^{th}$ order beam) and a pair of first sub-beams (± first order beam), and the laser beam incident on the second region 10b is split into a main beam (zero$^{th}$ order beam) and a pair of second sub-beams (± first order beams).

The beam splitter 11 is, for example, of a reflection type having a function to reflect the laser beam emitted by the photoemission element 9 at a splitting plane 11a to guide to the collimator lens 12 and transmit a return laser beam reflected by the disk-like recoding medium 100 to guide to the optical axis combining element 15.

The collimator lens 12 has a function for making the incident laser beam a parallel beam. The rising mirror 13 has a function for guiding the laser beam to the object lens 14 and to the collimator lens 12 by reflection. The objective lens 14 has a function for condensing the incident laser beam a recording track on the disk-like recording medium 100.

The optical axis combining element 15 has a function for compensating a direction of an optical axis of the laser beam having the first wavelength deviating from the optical axis of the optical system to direct it to a predetermined photosensitive point of the photosensitive element.

The adjusting lens 16 is a lens for adjusting magnifying power of the laser beams.

The photosensitive element 17 has three photosensitive areas receiving the zero$^{th}$ order beam and the ± first order beams, respectively.

In the optical pickup 6 structured as mentioned above, when the photoemission element 9 emits the laser beam having the first wavelength, namely, the laser beam having the wavelength of 785 nm corresponding to the CD 100a, the laser beam is diffracted by the diffraction element 10 to be split into the main beam and a pair of the first sub-beams and a pair of the second sub-beams.

The diffracted laser beam is reflected by a splitting plane 11a of the beam splitter 11, collimated by the collimator lens 12, and directed by the rising mirror 14 to be irradiated on the recording surface of the CD 100a mounted on the disk table through the objective lens 14. The laser beam irradiated on the recording surface of the CD 100a is reflected and is incident again as a return beam on the beam splitter 11 through the objective lens 14, the rising mirror 13 and the collimator lens 12 again. The return beam incident on the beam splitter 11 is transmitted through the splitting plane Ha of the beam splitter 11 and is incident on the photosensitive element 17 through the adjusting lens 16 in which the optical axis direction is compensated by the optical axis combining element 15.

Figure 7:
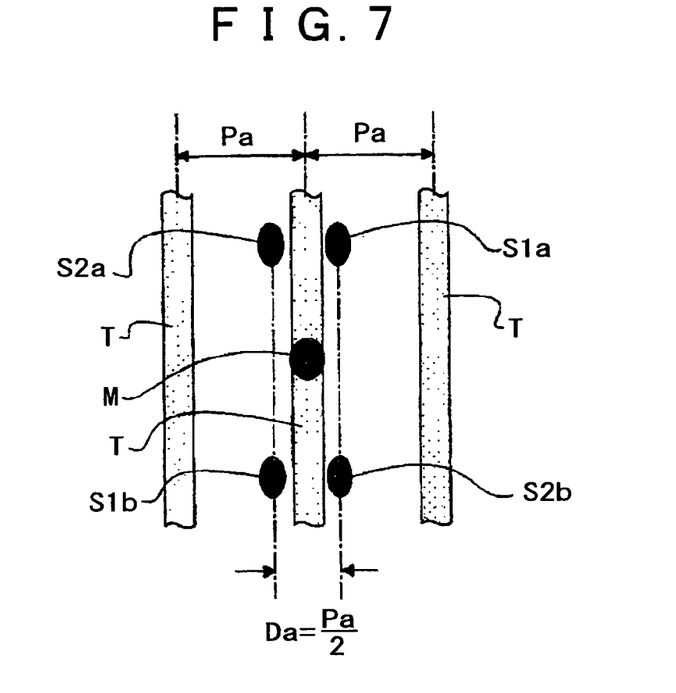
FIG. 7 is a conceptual drawing illustrating a positional relation between spots of a laser beam and tracks for a laser beam for a CD when distances between sub-spots are set to a half of a track pitch for a laser beam for a CD.

In the optical pickup 6, if it is assumed that a track pitch of the CD 100a is Pa, and n is a natural number, the diffraction element 10 is so designed that distances Da between centers of the spots S1a and S1b formed by the first sub-beam and centers of the spots S2a, S2b formed by the second sub-beams are approximately $(2n-1) \times P/2$, respectively. More specifically, as shown in FIG. 7, the first sub-spots S1a and S1b of the first sub-beams locate opposite by 180° with respect to the main spot M, and the second sub-spots S2a and S2b of the second sub-beams locate opposite by 180° with respect to the main spot M. The sub-spot S1a of the first sub-beam and the sub-spot S2a of the second sub-beam are spaced in a substantially radial direction of the CD 100a, and similarly sub-spot S1b of the first sub-beam and the sub-spot S2b of the second sub-beam are spaced in the substantially radial direction of the CD 100a. A distance Da between the center of the sub-spot S1a and the center of the sub-spot S2a and a distance Da between the center of the sub-spot S1b and the center of the sub-spot S2b are approximately $(2n-1) \times Pa/2$, respectively.

Because a track pitch of the CD 100a is defined to be about 1.6 μm by its standard, the distance Da is about 0.8 μm (n=1).

Figure 8:
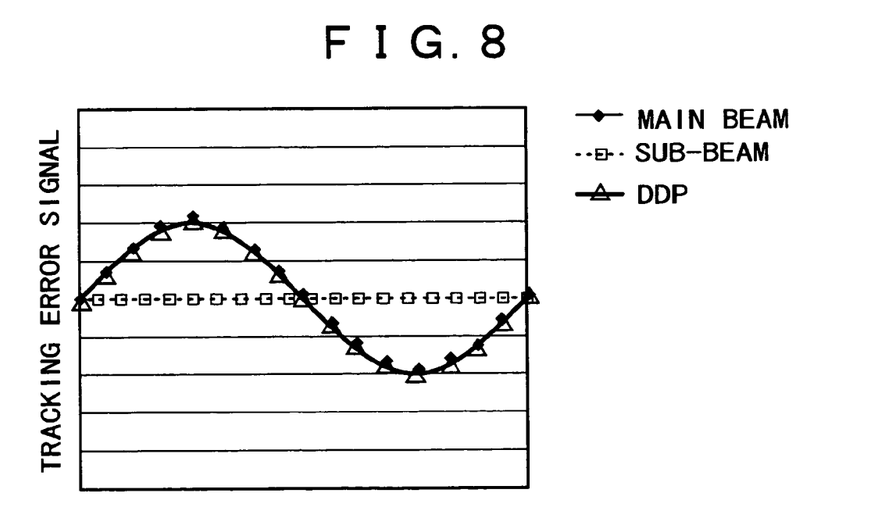
FIG. 8 is a graphical drawing illustrating a tracking error signal.

When the return beam is incident on the photosensitive element 17, the tracking error signal is detected on the basis of the main beam and the sub-beams received by the photosensitive element 17. As mentioned above, for the sub-beam, the distance Da is defined to be about a half of track pitch Pa. Accordingly, the phase of the tracking error signal detected by the sub-spot S1a and the sub-spot S2a is inverted as well as the phase of the tracking error signal detected by the sub-spot S1b and the sub-spot S2b is inverted. Accordingly, the tracking error signal of the total of the sub-beams is, as shown in FIG. 8, has an amplitude of zero, so that only the DC offset signal can be detected which is developed when the objective lens 14 deviates in the tracking direction. Regarding the main beam, its tracking error signal and DC offset signal are detected. However, canceling the DC offset signal detected from the sub-beams with the DC offset signal detected from the main beam provides a suitable tracking error detection signal.

Further, the distance Da between the sub-spots is uniquely determined by the design of the diffraction element 10. Accordingly, occurrence of change in phases of the tracking error signal detected from the main beam and the tracking error signal detected from the sub-beams due to eccentricity of the DC 100a does not results in an unsatisfied condition of decrease in amplitude of the DPP signal due to the eccentricity of the CD 100a, since the tracking error signals of the total of sub-beams are cancelled.

On the other hand, the laser beam having the second wavelength from the photoemission element 9, that is, the laser beam having the wavelength of 660 nm corresponding to the DVD 100b, the laser beam is split into a main beam, a pair of first sub-beams, and a pair of second sub-beams by diffraction.

The diffracted laser beam is reflected by a splitting plane 11a of the beam splitter 11, collimated by the collimator lens 12, and directed by the rising mirror 14 to be irradiated on the recording plan of the DVD 100b mounted on the disk table through the objective lens 14. The laser beam irradiated on the recording surface of the DVD 100b is reflected by the recording medium and is incident as a return beam on the beam splitter 11 through the objective lens 14, the rising mirror 13 and the collimator lens 12 again. The return beam incident on the beam splitter 11 is transmitted through the splitting plane 11a of the beam splitter 11 and is incident on the photosensitive element 17 through the optical axis combining element 15 and the adjusting lens 16.

In the optical pickup 6, as mentioned above, in the case of the CD 100a, the diffraction element 10 is so designed that the distance Da between centers of the spots S1a and S1b of the first sub-beam and centers of the spots S2a, S2b of the second sub-beams are approximately (2n−1)×P/2, respectively. Since a diffraction angle in the diffraction element 10 is proportional to the wavelength, for the laser beam having the second wavelength, a distance Db between centers of the sub-spot S1c of the first sub-beam and the sub-spot S2c of the second sub-beam and a distance Db between centers of the sub-spot S1d of the first sub-beam and the sub-spot S2d of the second sub-beam is calculated from Db=(660/785)×Da, wherein Da=0.8 µm, so that Db=0.67 µm.

Figure 9:
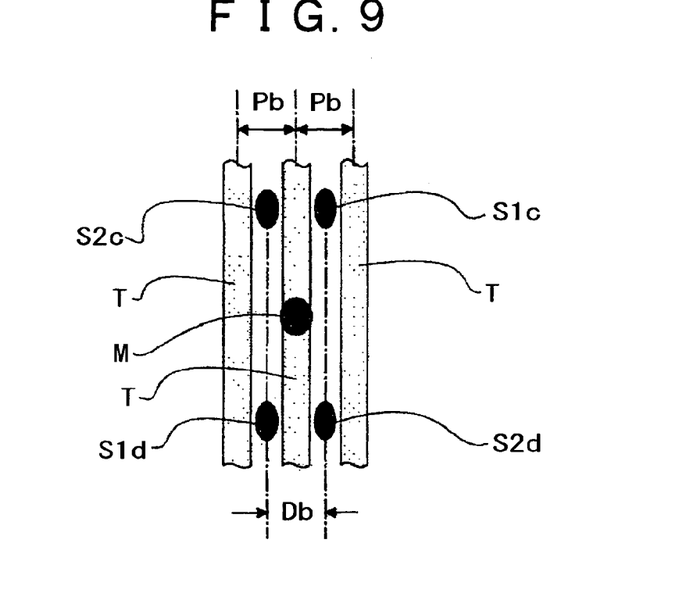
FIG. 9 is a conceptual drawing illustrating a positional relation between spots of a laser beam and tracks for a laser beam for a CD when distances between sub-spots are set to a half of a track pitch for a laser beam for a DVD.

In this condition, if the DVD 100b is a DVD-ROM, a DVD±R, or a DVD-RW, the track pitch Pb is 0.74 µm defined by the standard, the distance Db has a value close to the track pitch Pb. Accordingly, in this case, as shown in FIG. 9, all of the sub-spots S1c, S1d, S2c, and S2d are located between adjacent tracks T and T. Accordingly, the tracking error signal can be detected by the differential push-pull method described in the "background art".

On the other hand, if the DVD 100b is a DVD-RAM, because the track pitch Pb' is 1.23 µm defined by the standard, the distance Db (=0.67 µm) is about a half of the track pitch Pb'. Accordingly, in this case, similarly to the case the CD 100a, the phase of the tracking error signal detected from the sub-spot S1c and the sub-spot S2c is approximately inverted as well as the tracking error signal detected from the sub-spot S1d and the sub-spot S2d is approximately inverted, so that the amplitude of the tracking error signal detected from the whole of the sub-beams becomes zero. Accordingly, canceling the DC offset signal detected from the sub-beams with the DC offset signal detected from the main beam provides detection of a correct tracking error signal.

The example has been described above in which upon recording or reproducing of the CD 100a, the distance Da is approximately (2n−1)×Pa/2. Contrary, as described below, upon recording or reproducing of the DVD 100b, also the distance (referred to as Dd) can be made approximately (2n−1)×Pb/2.

Figure 10:
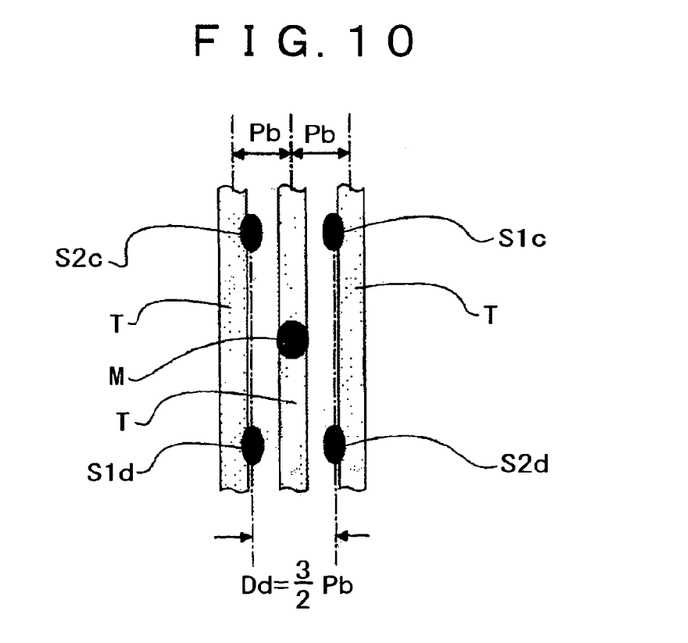
FIG. 10 is a conceptual drawing illustrating a positional relation between spots of a laser beam and tracks for the laser beam for a DVD when distances between sub-spots are set to a half of a track pitch for the laser beam of a DVD.

If it is assumed that a track pitch of the DVD 100b is Pb, and n is a natural number, as shown in FIG. 10, the diffraction element 10 is designed so as to make a distance Dd between the center of the sub-spot S1c and the center of the sub-spot S2c of the laser beam having the second wavelength and a distance Dd between the center of the sub-spot S1d and the center of the sub-spot S2d are approximately (2n−1)×Pb/2, respectively.

Because the track pitch of the DVD 100b, in the case of DVD-ROM, DVD±R, or DVD-RW, is defined to be about 0.74 µm by its standard, the distance Dd is about 1.11 µm (n=2). As described above, because the distance Dd is about 1.5 times the track pitch Pb, the phase of the tracking error signal detected from the sub-spot S1c, and the sub-spot S2c is approximately inverted as well as the tracking error signal detected from the sub-spot S1d and the sub-spot S2d is approximately inverted, so that the amplitude of the tracking error signal becomes zero. This provides detection of only the DC offset signal developed when the objective lens 14 is displaced in the tracking direction. Regarding the main beam, the tracking error signal is detected, and the DC offset signal is also detected. Canceling the DC offset signal detected from the sub-beams with the DC offset signal detected from the main beam provides detection of a correct tracking error signal.

On the other hand, for the laser beam having the first wavelength corresponding to the CD 100a, a distance Dc between centers of the sub-spot S1a of the first sub-beam and the sub-spot S2a of the second sub-beam and a distance Dc between centers of the sub-spot S1b of the first sub-beam and the sub-spot S2b of the second sub-beam are calculated from Dc=(785/660)×Dd, wherein Dd=1.11 µm, so that Dc=1.32 µm.

In this condition, because the track pitch Pa of the CD 100a is 1.6 µm, the distance Dc has a value close to the track pitch Pa. Accordingly, in this case, all of the sub-spots S1a, S1b, S2a, and S2b are located between adjacent tracks T and T, so that the tracking error signal can be detected by the differential push-pull method as described above.

Further, if the DVD 100b is a DVD-RAM, because the track pitch Pb' is 1.23 µm, the distance Dd (=1.11 µm) has a value close to the track pitch Pb'. Accordingly, also in this case, all of the sub-spots S1c, S1d, S2c, and S2c are located between adjacent tracks T and T. Accordingly, the tracking error signal can be detected by the differential push-pull method as described above.

As mentioned above, in the optical pickup 6, upon the recording or reproduction of the information signal with respect to the disk-like recording medium 100, the quality of the tracking error signal can be improved, and, in the detection of the tracking error signal, the effect of eccentricity of a disk-like recording medium 100 or effect of the rotational deviation of the diffraction element 10 may be suppressed.

Further, if the recording or reproduction is performed for different types of disk-like recording media 100, the diffraction element 10 can be commonly used. This can improve the quality of the tracking error signal without increase in the number of parts and cost.

Further, as to the DVDs, the DVD-ROM, the DVD±R, the DVD-RW, or the DVD-RAM can be dealt with, so that the quality of the tracking error signal can be improved irrespective of the type of the DVD.

Further, in the description mentioned above, assuming n is a natural number, n=1 or n=2 is shown as examples in the present invention. However, the natural number n is optionally given.

The optical pickup 6 using two different wavelengths is described as an example. However, the present invention is applicable to an optical pickup using more than two wavelengths. In this case, three types of disks, such as the CD, the DVD, and a Blue-ray Disc or the like can be dealt with. In the case that more than two types of laser beams are used, in any one of laser beams, the distance D between spots of sub-beams is made approximately (2n−1)×P/2.

Further, the present invention is applicable to an optical pickup using only one wavelength. In this case, in the used laser beam, the distance D between spots of sub-beams is made approximately (2n−1)×P/2.

Accordingly, in the case that the present invention is applied to the optical pickup using a laser beam having only one wavelength, because of the detection of the tracking error signal, the effect of eccentricity of a disk-like recording medium may be suppressed, and the quality of the tracking error signal may be improved.

Further, the rotation adjustment of the diffraction element may be eliminated since the effect of the rotational deviation of the diffraction element may be suppressed, whereby allowing the production of the optical pickup at a lower cost with a higher reliability.

Figure 11:
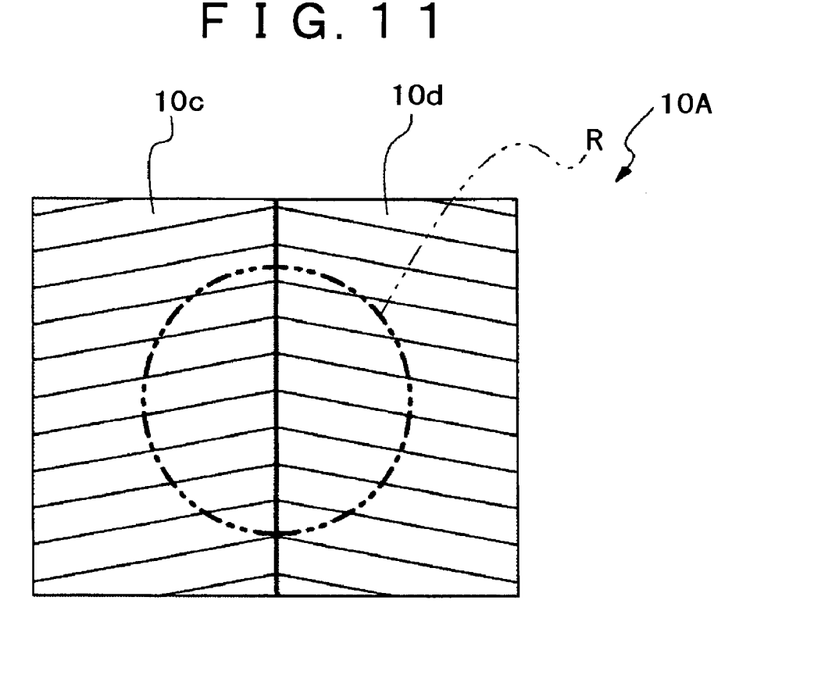
FIG. 11 is a conceptual drawing illustrating a modification of a diffraction element.
Figure 12:
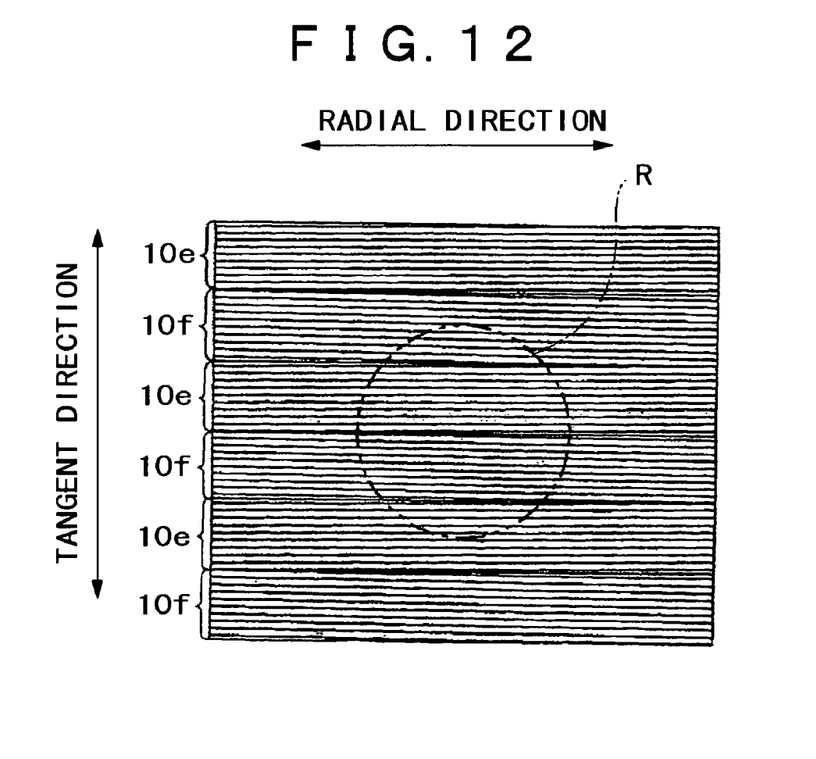
FIG. 12 is a conceptual drawing illustrating another modification of a diffraction element.

Next, modifications of the diffraction element will be shown in FIGS. 11 and 12.

In a diffraction element 10A shown in FIG. 11, a first region 10c and the second region 10d are formed at places perpendicular to the first region 10a and the second region 10b of the diffraction element 10.

If the diffraction element 10A is used instead of the diffraction element 10, the laser beam is split into a main beam and two pairs of sub-beams to form the main spot and two pairs of sub-spots on the recording surface of the disk-like recoding medium.

On a diffraction element 10B shown in FIG. 12, a plurality of first regions 10e, 10e, . . . , and a plurality of second regions 10f, 10f, . . . are alternately formed, and an arrangement direction of the plurality of first regions 10e, 10e, . . . , and the plurality of second regions 10f, 10f, . . . is a tangential direction of the disk-like recording medium 100.

In the diffraction element 10B, the number of regions is larger than those of the diffraction elements 10 and 10A.

Here, in the optical pickup, typically, a difference may be occur in an amount of light between sub-beams irradiated on the recording surface of the disk-like recording medium due to effect of an incident angle and an incident position, of the laser beam emitted from the photoemission element with respect to the opening of the objective lens or diffraction, because the photoemission element is not located adjacent to the objective lens, that is, they are spaced. For example, if the whole of one sub-beam is incident on the opening of the objective lens while a part of the other sub-beam is incident on a position outside of the opening and the other part is incident on the opening, there would be a difference in an amount of light between one sub-spot and the other sub-spot formed on the recording surface of the disk-like recording medium.

On the other hand, as in the case of the diffraction element 10B, increase in the number of divided regions makes the laser beam R enter across the plurality of the first regions 10e, 10e, . . . , and the second regions 10f, 10f, . . . . This easily makes a total area of the first regions 10e, 10e, . . . equal to the total area of the second regions 10f, 10f, . . . . Accordingly, the amounts of light of the sub-spot S1 and the sub-spot S2 formed with space in the substantially radial direction, are readily substantially equal to each other, which can surely cancel the tracking error signals detected from respective sub-beams each other. This can improve reliability of the tracking control operation.

Further, during the tracking control operation, because the objective lens 14 is moved in the substantially radial direction of the disk-like recording medium 100, making the arrangement direction of the first regions 10e, 10e, . . . , and the second regions 10f, 10f, . . . in the tangential direction results in no change in relative position between the laser beam R and the first regions 10e, 10e, . . . , and the second regions 10f, 10f, . . . which does not adversely affect the generation of the sub-beams.

Further, because a push-pull signal is changed substantially in a radial direction of the disk-like recording medium 100, making the arrangement direction of the first regions 10e, 10e, . . . , and the second regions 10f, 10f, . . . in the tangential direction results in no change in the relation between the main beam and the original laser beam before diffraction, which does not adversely affect the modulation.

The configurations and structures of respective elements shown in the above description in best mode are only exemplary shown to embody the present invention and shall be interpreted not in a limiting sense.

What is claimed is:

1. An optical pickup configured to irradiate a laser beam emitted from a photoemission element onto a disk-like recording medium through an objective lens, the optical pickup comprising:

a diffraction element configured to split the laser beam emitted from the photoemission element into a main beam, a pair of first sub-beams, and a pair of second sub-beams, the diffraction element including a first region configured to split a portion of the laser beam emitted from the photoemission element that is incident on the first region into the main beam and the pair of first sub-beams, the diffraction element including a second region configured to split a portion of the laser beam that is incident on the second region into the main beam and the pair of second sub-beams, the diffraction element being arranged in the optical pickup such that the pair of first sub-beams form a pair of first sub-beam spots on a recording surface of the disk-like recording medium and the pair of second sub-beams form a pair of second sub-beam spots on the recording surface of the disk-like recording medium such that:

$$D=(2n-1)\times P/2$$

wherein D is a distance between a spot center of one of the pair of first sub-beam spots and a spot center of one of the pair of second sub-beam spots, the one of the pair of first sub-beam spots and the one of the pair of second sub-beam spots being spaced in a substantially radial direction of the disk-like recording medium, n is a natural number, and P is a track pitch of the disk-like recording medium.

2. The optical pickup according to claim 1, wherein the diffraction element includes a plurality of the first regions and a plurality of the second regions.

3. The optical pickup according to claim 1, wherein the first region and the second region are disposed in a tangential direction with respect to the disk-like recording medium.

4. The optical pickup according to claim 2, wherein the plurality of the first regions and the plurality of the second regions are arranged such that each first region and each second region is alternately disposed with respect to a tangential direction of the disk-like recording medium.

5. An optical pickup that is configured to record or reproduce an information signal for a plurality of different types of disk-like recording media using different wavelengths, the optical pickup being configured to irradiate a laser beam that includes a wavelength that corresponds to one of the plurality of different types of disk-like recording media and that is emitted from a photoemission element onto a disk-like recording medium through an objective lens, the optical pickup comprising:

a diffraction element configured to split the laser beam that includes the wavelength that corresponds to one of the plurality of different types of disk-like recording media into a main beam, a pair of first sub-beams, and a pair of second sub-beams, the diffraction element including a first region configured to split a portion of the laser beam that is incident on the first region into the main beam and the pair of first sub-beams, the diffraction element including a second region configured to split a portion of the laser beam that is incident on the second region into the main beam and the pair of second sub-beams, the diffraction element being arranged in the optical pickup such that the pair of first sub-beams form a pair of first sub-beam spots on a recording surface of the disk-like recording medium and the pair of second sub-beams form a pair of second sub-beam spots on the recording surface of the disk-like recording medium such that:

$$D=(2n-1)\times P/2$$

wherein D is a distance between a spot center of one of the pair of first sub-beam spots and a spot center of one of the pair of second sub-beam spots, the one of the pair of first sub-beam spots and the one of the pair of second sub-beam spots being spaced in a substantially radial direction of the disk-like recording medium, n is a natural number, and P is a track pitch of the disk-like recording medium.

6. The optical pickup according to claim 5, wherein the diffraction element includes a plurality of the first regions and a plurality of the second regions.

7. The optical pickup according to claim 5, wherein the first region and the second region are disposed in a tangential direction with respect to the disk-like recording medium.

8. The optical pickup according to claim 6, wherein the plurality of the first regions and the plurality of the second regions are arranged such that each first region and each second region is alternately disposed in a tangential direction with respect to the disk-like recording medium.

9. A disk drive apparatus comprising:
a disk table configured to receive and rotate a disk-like recording medium; and
an optical pickup that includes an objective lens driving unit that is supported on a moving base that is configured to move in a radial direction of the disk-like recording medium, the optical pickup being configured to irradiate a laser beam on the disk-like recording medium through an objective lens; the optical pickup including
a diffraction element configured to split the laser beam emitted from the photoemission element into a main beam, a pair of first sub-beams, and a pair of second sub-beams, the diffraction element including a first region configured to split a portion of the laser beam emitted from the photoemission element that is incident on the first region into the main beam and the pair of first sub-beams, the diffraction element including a second region configured to split a portion of the laser beam that is incident on the second region into the main beam and the pair of second sub-beams, the diffraction element being arranged in the optical pickup such that the pair of first sub-beams form a pair of first sub-beam spots on a recording surface of the disk-like recording medium and the pair of second sub-beams form a pair of second sub-beam spots on the recording surface of the disk-like recording medium such that:

$$D=(2n-1)\times P/2$$

wherein D is a distance between a spot center of one of the pair of first sub-beam spots and a spot center of one of the pair of second sub-beam spots, the one of the pair of first sub-beam spots and the one of the pair of second sub-beam spots being spaced in a substantially radial direction of the disk-like recording medium, n is a natural number, and P is a track pitch of the disk-like recording medium.

10. The disk drive apparatus according to claim 9, wherein the diffraction element includes a plurality of the first regions and a plurality of the second regions.

11. The disk drive apparatus according to claim 9, wherein the first region and the second region are disposed in a tangential direction with respect to the disk-like recording medium.

12. The disk drive apparatus according to claim 10, wherein the plurality of the first regions and the plurality of the second regions are arranged such that each first region and each second region is alternately disposed in a tangential direction with respect to the disk-like recording medium.

13. A disk drive apparatus configured to record or reproduce an information signal for a plurality of different types of disk-like recording media using different wavelengths, the disk drive apparatus comprising:
a disk table configured to receive and rotate a disk-like recording medium; and
an optical pickup that includes an objective lens driving unit that is supported on a moving base that is configured to move in a radial direction of the disk-like recording medium, the optical pickup being configured to irradiate a laser beam on the disk-like recording medium through an objective lens, the laser beam including a wavelength that corresponds to the type of the mounted disk-like recording medium, the optical pickup including
a diffraction element configured to split the laser beam that includes the wavelength that corresponds to one of the plurality of different types of disk-like recording media into a main beam, a pair of first sub-beams, and a pair of second sub-beams, the diffraction element including a first region configured to split a portion of the laser beam that is incident on the first region into the main beam and the pair of first sub-beams, the diffraction element including a second region configured to split a portion of the laser beam that is incident on the second region into the main beam and the pair of second sub-beams, the diffraction element being arranged in the optical pickup such that the pair of first sub-beams form a pair of first sub-beam spots on a recording surface of the disk-like recording medium and the pair of second sub-beams form a pair of second sub-beam spots on the recording surface of the disk-like recording medium such that:

$$D=(2n-1)\times P/2$$

wherein D is a distance between a spot center of one of the pair of first sub-beam spots and a spot center of one of the pair of second sub-beam spots, the one of the pair of first sub-beam spots and the one of the pair of second sub-beam spots being spaced in a substantially radial direction of the disk-like recording medium, n is a natural number, and P is a track pitch of the disk-like recording medium.

14. The disk drive apparatus according to claim 13, wherein the diffraction element includes a plurality of the first regions and a plurality of the second regions.

15. The disk drive apparatus according to claim 13, wherein the first region and the second region are disposed in a tangential direction with respect to the disk-like recording medium.

16. The disk drive apparatus according to claim 14, wherein the plurality of the first regions and the plurality of the second regions are arranged such that each first region and each second region is alternately disposed in a tangential direction with respect to the disk-like recording medium.

* * * * *